(12) United States Patent
Sato et al.

(10) Patent No.: US 7,692,860 B2
(45) Date of Patent: Apr. 6, 2010

(54) WIRE GRID POLARIZER AND METHOD OF MANUFACTURING THE SAME

(75) Inventors: Atsushi Sato, Kanagawa (JP); Hitomu Watanabe, Kanagawa (JP); Yoshihide Nagata, Kanagawa (JP)

(73) Assignee: Cheil Industries, Inc., Gumi-si, Gyeongsangbuk-do (KR)

( * ) Notice: Subject to any disclaimer, the term of this patent is extended or adjusted under 35 U.S.C. 154(b) by 72 days.

(21) Appl. No.: 11/987,952

(22) Filed: Dec. 6, 2007

(65) Prior Publication Data
US 2008/0137188 A1 Jun. 12, 2008

(30) Foreign Application Priority Data
Dec. 7, 2006 (JP) .............................. 2006-330563

(51) Int. Cl.
*G02B 5/30* (2006.01)
(52) U.S. Cl. ....................................... 359/486
(58) Field of Classification Search .................. 359/486
See application file for complete search history.

(56) References Cited

U.S. PATENT DOCUMENTS 4,321,282 A * 3/1982 Johnson ........................ 216/59
6,665,119 B1 * 12/2003 Kurtz et al. .................... 359/486
2004/0239833 A1 * 12/2004 Kawazu et al. .................. 349/96
2005/0088739 A1 * 4/2005 Chiu et al. ..................... 359/486
2006/0215263 A1 * 9/2006 Mi et al. ....................... 359/486
2007/0217008 A1 * 9/2007 Wang et al. .................... 359/486
2009/0046362 A1 * 2/2009 Guo et al. ..................... 359/486

FOREIGN PATENT DOCUMENTS

JP 2004-157159 6/2004

OTHER PUBLICATIONS

Auton, J.P., "Infrared Transmission Polarizers by Photolithography" Applied Optics, vol. 6, No. 6, pp. 1023-1027 (1967).
Kahn, F.J., "Focus: Doing it with stripes—Moxtek ProFlux (tm) wire-grid polarizers solve reflective and transmissive projection system problems", Private Line Report on Projection Display, vol. 7, No. 10, pp. 3-14, (2001).

* cited by examiner

*Primary Examiner*—Lee Fineman
(74) *Attorney, Agent, or Firm*—Lee & Morse, P.C.

(57) ABSTRACT

A wire grid polarizer includes a substrate adapted to transmit predetermined wavelengths of light, a plurality of dielectric wires extending parallel to one another along a first direction on the substrate, the dielectric wires including a dielectric material adapted to transmit the predetermined wavelengths of light, and a plurality of metal wires extending along the first direction between the dielectric wires, wherein sidewalls of the metal wires include portions in contact with sidewalls of the dielectric wires and portions not in contact with the sidewalls of the dielectric wires.

20 Claims, 16 Drawing Sheets

WIRE GRID POLARIZER AND METHOD OF MANUFACTURING THE SAME

BACKGROUND OF THE INVENTION

1. Field of the Invention

Embodiments of the present invention relate to a wire grid polarizer and a method of manufacturing the same.

2. Description of the Related Art

A polarizer may convert unpolarized light into polarized light, and may be used in, e.g., optical devices, liquid crystal display (LCD) technology, and so forth. A conventional polarizer may split unpolarized light into two polarized components orthogonal to each other, and may, e.g., absorb and/or reflect an undesired polarized component, while transmitting a desired polarized component.

A conventional polarizer absorbing an undesired polarized component may absorb only about 50% or less of light, thereby transmitting some unpolarized light and causing deteriorated brightness and excessive power consumption. A conventional polarizer reflecting an undesired component may have a low polarized-light separation, thereby triggering low contrast. Joint use of absorbing and reflecting polarizers may increase an overall number of elements in a device, enhance size and weight of the device, and increase manufacturing time and costs.

An attempt has been made to use a wire grid polarizer. The conventional wire grid polarizer may include a plurality of metal wires parallel to one another on a substrate, so a pitch between adjacent wires may be shorter than a wavelength of an incident light. As such, unpolarized light incident on the conventional wire grid polarizer may be split into two polarized light components with respect to a direction of an electric-field thereof. More specifically, a light component having an electric field orthogonal to a longitudinal direction of the metal wires, i.e. TM polarized-light, may be transmitted through the wire grid polarizer, and a light component having an electric-field parallel to the longitudinal direction of the metal wires, i.e., TE polarized-light, may be reflected away from the wire grid polarizer.

Proper functioning of a wire grid polarizer, e.g., in a visible light range, may require high transmittance and extinction ratio, and a structure having metal wires with both high aspect ratio and fine distance therebetween, e.g., a pitch of about 200 nm or less. However, conventional wire grid polarizers having metal wires with a high aspect ratio and fine distance therebetween may be hard to manufacture, and may exhibit low compression and/or extension thresholds, thereby providing mechanically unstable and/or unreliable structures. Attempts to strengthen the metal wires of the conventional wire grid polarizer, while maintaining proper functioning thereof may result in complex and impractical structures requiring difficult manufacturing processes.

SUMMARY OF THE INVENTION

Embodiments of the present invention are therefore directed to a wire grid polarizer and a method of manufacturing the same, which substantially overcome one or more of the disadvantages of the related art.

It is therefore a feature of an embodiment of the present invention to provide a wire gird polarizer with high transmittance and improved extinction ratio.

It is another feature of an embodiment of the present invention to provide a wire gird polarizer with an increased structural reliability.

It is yet another feature of an embodiment of the present invention to provide a method of manufacturing a wire gird polarizer with one or more of the above features.

At least one of the above and other features and advantages of the present invention may be realized by providing a wire grid polarizer, including a substrate adapted to transmit predetermined wavelengths of light, a plurality of dielectric wires extending parallel to one another along a first direction on the substrate, the dielectric wires including a dielectric material adapted to transmit the predetermined wavelengths of light, and a plurality of metal wires extending along the first direction between the dielectric wires, wherein sidewalls of the metal wires include portions in contact with sidewalls of the dielectric wires and portions not in contact with the sidewalls of the dielectric wires. One sidewall of each metal wire may be in direct contact along its entire length with a sidewall of an adjacent dielectric wire. At least one sidewall of two sidewalls of each metal wire may include a portion not in contact with an adjacent dielectric wire.

Two metal wires may be between two adjacent dielectric wires. The two metal wires between the two adjacent dielectric wires may be spaced apart. The dielectric wires may be wider than the metal wires. A height of the dielectric wires may be about 40% to about 70% of a height of the metal wires. A single metal wire may be between two adjacent dielectric wires.

At least one of the above and other features and advantages of the present invention may be further realized by providing a wire grid polarizer, including a substrate adapted to transmit predetermined wavelengths of light, and a plurality of patterns spaced apart and extending along a first direction on the substrate, the patterns having a multi-wire structure including a dielectric wire between two metal wires.

At least one of the above and other features and advantages of the present invention may be also realized by providing a method of manufacturing a wire grid polarizer, including forming a plurality of dielectric wires along a first direction on a substrate adapted to transmit predetermined wavelengths of light, such that the dielectric wires are parallel to one another and include a dielectric material adapted to transmit the predetermined wavelengths of light, and forming a plurality of metal wires extending along the first direction between the dielectric wires, such that sidewalls of the metal wires include portions in contact with sidewalls of the dielectric wires and portions not in contact with the sidewalls of the dielectric wires.

Forming the plurality of metal wires may include forming a metal layer to coat upper surfaces and sidewalls of the dielectric wires. Forming the metal layer may include chemical vapor deposition. Forming the plurality of metal wires may include removing portions of the metal layer by an anisotropic etching to form two metal wires between two adjacent dielectric wires. Removing the metal layer may include a reactive ion etching. The method may further include removing upper portions of the dielectric wires. Removing upper portions of the dielectric wires may include forming dielectric wires having a height that equals about 40% to about 70% of a height of the metal wires.

Forming the plurality of metal wires may include forming a metal layer to fill trenches between adjacent dielectric wires and coat upper surfaces thereof. Forming the plurality of metal wires may include removing portions of the metal layer to expose upper surfaces of the dielectric wires, and removing upper portions of the dielectric wires, such that a height of the dielectric wires equals about 40% to about 70% of a height of the metal wires. Forming the plurality of dielectric wires may include performing a nano-imprint lithography.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1:
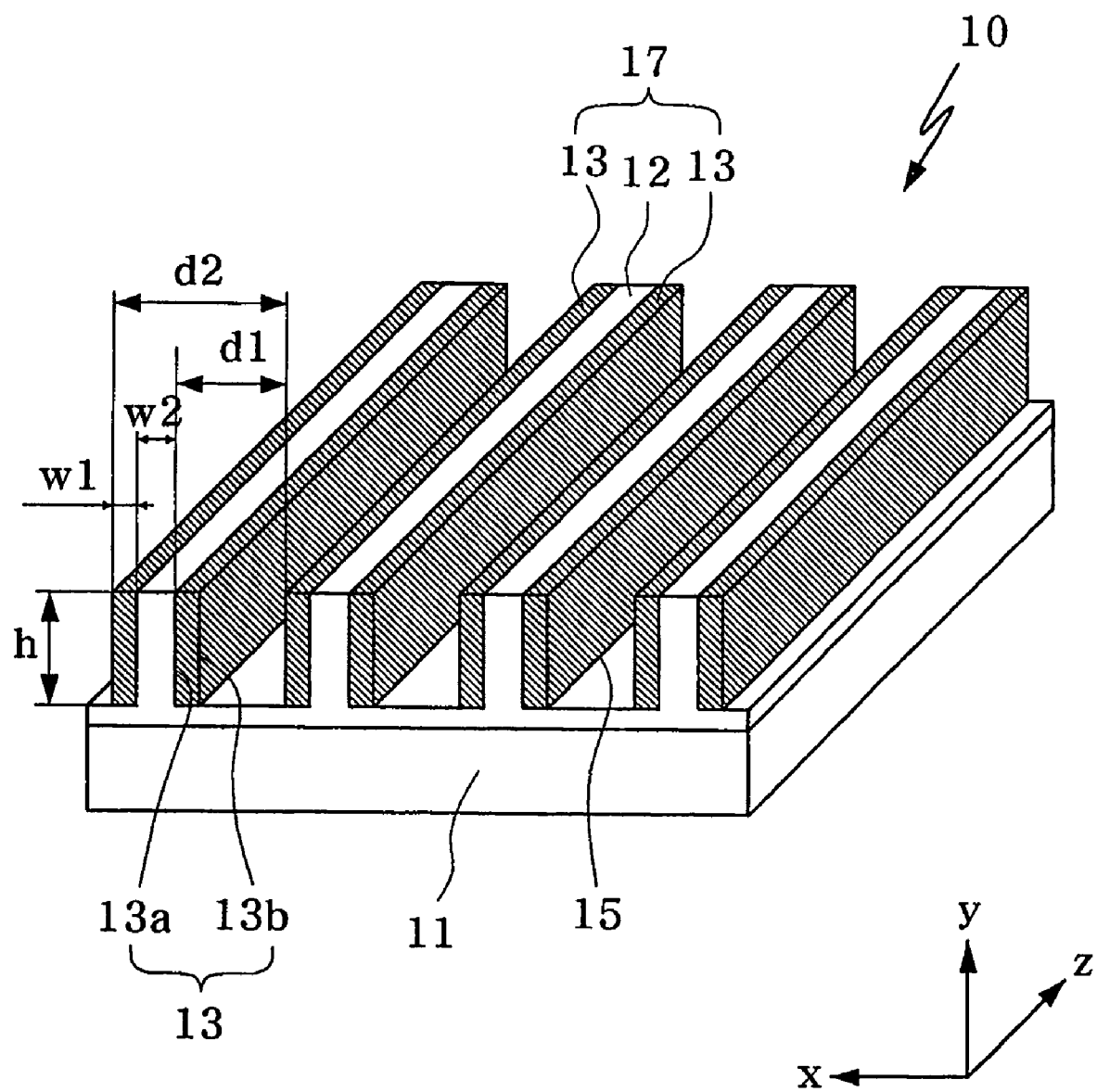
FIG. 1 illustrates a perspective view of a wire grid polarizer according to an embodiment of the present invention.

Japanese Patent Application No. 2006-330563, filed on Dec. 7, 2006, in the Japanese Patent Office, and entitled: "Wire Grid Polarizer and Method of Manufacturing the Same," is incorporated by reference herein in its entirety.

Embodiments of the present invention will now be described more fully hereinafter with reference to the accompanying drawings, in which exemplary embodiments of the invention are illustrated. Aspects of the invention may, however, be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, an exemplary embodiment of a wire grid polarizer according to the present invention will be described in more detail below with reference to FIG. 1. Referring to FIG. 1, a wire grid polarizer 10 may include a substrate 11, a plurality of dielectric wires 12, and a plurality of metal wires 13.

Each dielectric wire 12 of the wire grid polarizer 10 may extend along a first direction, e.g., along the z-axis, may have a predetermined height h, i.e., a distance as measured along the y-axis, and may have a width w2, i.e., a distance as measured along the x-axis. The dielectric wires 12 may have an elongated structure, and may be arranged parallel to one another on the substrate 11 to have a pitch d2, as illustrated in FIG. 1. A pitch hereinafter may refer to a sum of a width of one wire and a distance between two adjacent wires of a same type, e.g., a pitch d2 may equal a sum of the width w2 of one dielectric wire 12 and a distance between two adjacent dielectric wires 12.

The dielectric wires 12 may be made of a material capable of transmitting a predetermined wavelength of light, and may have a refractive index n. Further, the dielectric wires 12 may be made of a material having sufficient strength to support the metal wires 13 and sufficient cohesion ability relative to the material of the metal wires 13 and the substrate 11. For example, the dielectric wires 12 may be made of one or more of glass, polymethylmethacrylate (PMMA), polycarbonate (PC), polystyrene (PS), polyethyleneterephthalate (PET), polyethylenenaphthalate (PEN), diethylene-glycol-bis(allyl carbonate) (CR-39), styrene/acrylonitrile copolymer (SAN), styrene/methacryl-acid copolymer (MS), alicyclic acryl resin, and/or alicyclic polyolefin resin. The dielectric wires 12 may include any suitable additives.

The plurality of metal wires 13 of the wire grid polarizer 10 may have an elongated structure, and may extend along the first direction. In an implementation, the metal wires 13 may have the height h, i.e., the metal wires 13 may have a substantially same height as the dielectric wires 12. The metal wires 13 may extend between the dielectric wires 12. For example, a first sidewall 13a of each metal wire 13 may be in contact with a corresponding dielectric wire 12 and a second sidewall 13b of each metal wire 13 may be parallel to the first sidewall 13a, and may face an adjacent metal wire 13. Accordingly, two metal wires 13 may be positioned between every two adjacent dielectric wires 12, so each metal wire 13 may extend along an entire length of and be in contact with a sidewall of a corresponding dielectric wire 12. In other words, each dielectric wire 12 may be sandwiched between two metal wires 13 to form a pattern portion 17 having a multi-wire structure, e.g., one dielectric wire 12 between two metal wires 12. Gaps 15 may be formed between adjacent pattern portions 17.

Accordingly, even when the metal wires 13 are adjusted to have a high aspect ratio, i.e., a large height relative to a small width, the dielectric wires 12 may provide sufficient structural support and stability to the metal wires 13. Such structural support and stability may prevent fracture and/or collapse of the metal wires 13 due to, e.g., compression. It is further noted that additional layers and/or wires may or may not be interposed between the metal wires 13 and the dielectric wire 12 in the pattern portion 17.

The metal wires 13 may have a pitch d1, and each metal wire may have a width w1. The width w1 of the metal wires 13 may be related to the dielectric wires 12 according to 2·w1+w2<d2. The pitch d1 of the metal wires 13 may be about 50% or less of the pitch d2 of the dielectric wires 12, and the width w2 may be about 50% or less of the pitch d2. For example, if the wire grid polarizer 10 requires the pitch d1 to be about 200 nm or less in order to polarize visible light, the pitch d2 of the dielectric wires 12 may be about 400 nm or less, and the width w2 may be about 200 nm or less.

When a metal wire 13 is formed along each sidewall of a respective dielectric wire 12, i.e., two metal wires 13 per one dielectric wire 12, adjustment of the width w2 of the dielectric wires 112 may facilitate adjustment of a width of the gap 15. In other words, an increase of the width w2 of the dielectric wires 12 may decrease the width of the gaps 15, thereby facilitating formation of a wire grid polarizer with sufficiently high transmittance and extinction ratio via adjustment of the width w2. In this respect, it is noted that "sufficient transmittance" refers to an amount of about 40% or more of light passing through the wire grid polarizer of total light incident thereon. Alternatively, if only TM polarized-light is measured, "sufficient transmittance" may refer to transmittance of about 80% or more of TM polarized light. "Sufficient extinction ratio" refers to extinction ratio, i.e., a transmittance ratio of the TM polarized light to the TE polarized light, of about 20,000:1 or more.

The substrate 11 of the wire grid polarizer 10 may be formed of any suitable material capable of transmitting a predetermined wavelength of light. For example, when using the wire grid polarizer 10 in a LCD device requiring a high heat-resistance, the substrate 11 may be made of an inorganic material having a high heat-resistance and a high transparency with respect to visible light, e.g., glass. In another example, when using the wire grid polarizer 10 in a device not requiring a high heat resistance, the substrate 11 may be made of a resin, e.g., a transparent resin, such as polymethylmethacrylate (PMMA), polycarbonate (PC), polystyrene (PS), polyethyleneterephthalate (PET), polyethylenenaphthalate (PEN), diethylene-glycol-bis(allyl carbonate) (CR-39), styrene/acrylonitrile copolymer (SAN), styrene/methacryl-acid copolymer (MS), alicyclic acryl resin, alicyclic polyolefin resin, or the like. The substrate 11 may further include an anti-reflection layer on a surface facing away from the metal wires 13, thereby improving light efficiency through the wire grid polarizer 10.

Refractive indices of the substrate 11, metal wires 13, and dielectric wires 12 of the wire grid polarizer 10 may be determined with respect to desired transmittance and extinction ratio of the wire grid polarizer 10. For example, desired transmittance and polarized-light separation functions may require the metal wires 13 to be formed of any suitable metal material, e.g., a metal having a large extinction coefficient of visible light. An example of a material for forming the metal wires 13 may be aluminum. In another example, the substrate 11 and/or the dielectric wires 12 may be formed of a resin having a low-refractive index. Accordingly, a fluorine resin and/or a silicon resin may be mixed into any of the above described resin materials to reduce a refractive index thereof.

Figure 2A:
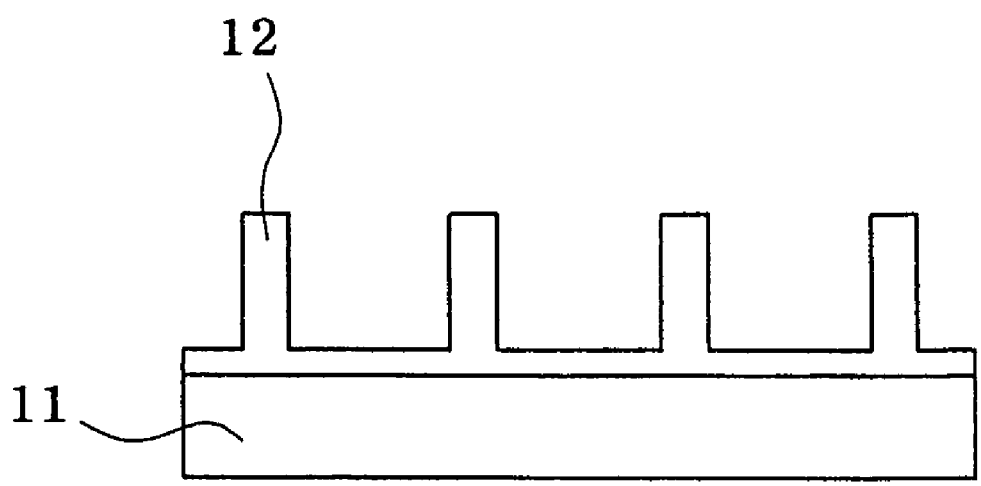
FIGS. 2A-2C illustrate cross-sectional views of stages in a method of manufacturing the wire grid polarizer of FIG. 1.
Figure 2A:
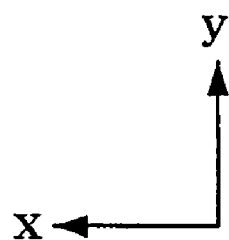

The wire grid polarizer 10 may be manufactured as follows. First, as illustrated in FIG. 2A, a resin layer may be processed by, e.g., nano-imprint lithography, to prepare the dielectric wires 12 to have the width w2, height h, and pitch d2, as described previously with respect to FIG. 1. The width w2 may have a size of about several tens of nanometers to several hundreds of nanometers. For example, a mold may be prepared by processing a silicon wafer via electron-beam lithography to form a plurality of trenches having a depth h, a pitch d2, and a width suitable to form the dielectric wires of width w2. A PC film may be coated with an ultraviolet (UV) curable resin, e.g., an acrylic UV curable resin, by means of a wire bar, followed by stacking the mold on the PC film. The curable resin may be cured by UV, so a pattern corresponding to the plurality of trenches of the mold may be imparted to the curable resin.

It should be noted, however, that other methods of forming the dielectric wires 12 are within the scope of the present invention. For example, if a thermal nano-imprint lithography is used instead of the UV nano-imprint lithography, the dielectric wires 12 may be made of polymethylmethacrylate (PMMA). That is, a surface of a glass substrate may be coated by, e.g., spin coating, with a solution including PMMA in a solvent. The coated solution may be dried to form a thin PMMA film, e.g., a film having a thickness of about 1 μm. The dielectric wires may be directly patterned on a surface of the substrate, i.e., on the PMMA film.

Figure 2B:
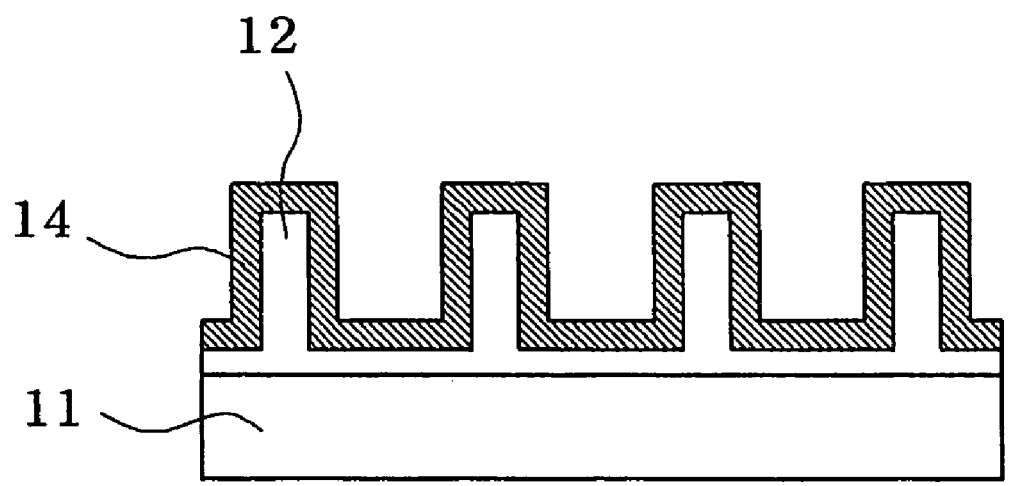
Figure 2B:
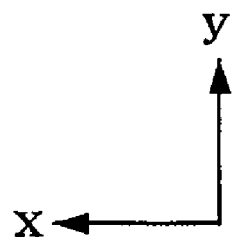

Once the dielectric wires 12 are formed on the substrate 11, a metal layer 14 may be formed on the dielectric wires 12, as illustrated in FIG. 2B. The metal layer 14 may be formed by, e.g., a physical vapor deposition (PVD) and/or a chemical vapor deposition (CVD), to coat an upper surface and sidewalls of each dielectric wire 12 and a bottom of each trench between adjacent dielectric wires 12. For example, a thin metal layer may be deposited by PVD, e.g., a thickness of about 5 nm, followed by metal deposition by CVD, thereby reducing a deposition time of metal by CVD and improving production efficiency thereof. The metal deposited by PDV may be substantially a same metal deposited by CVD or a different metal, e.g., titanium, in order to reduce deposition time. If PVD, e.g., a vacuum deposition process, sputtering, and so forth, is used, conditions, such as a vacuum degree, size of a deposition source, a fusion method, a substrate temperature, and so forth, may be adjusted to optimize a thickness of the metal layer deposited in the trenches, i.e., gaps between adjacent dielectric wires 12. In some situations, e.g., when the trenches have a size of less than about 300 nm, CVD may be preferred to PVD.

Figure 2C:
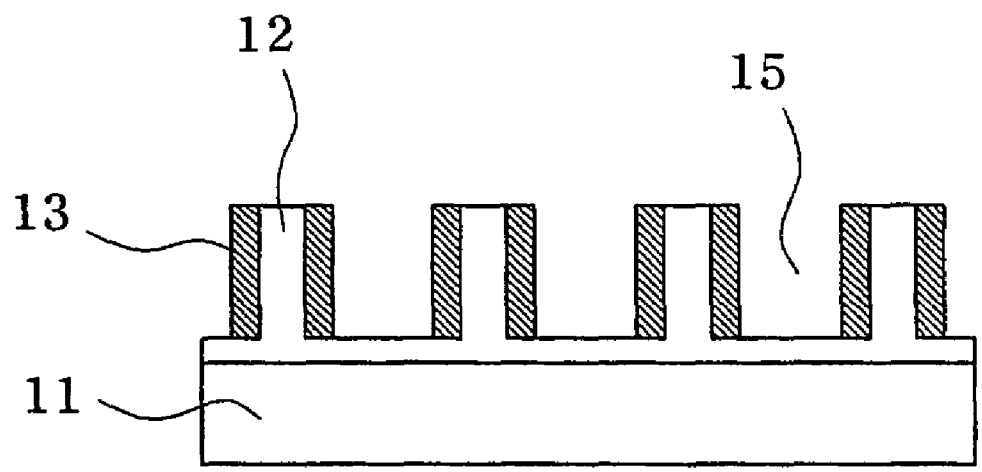
Figure 2C:
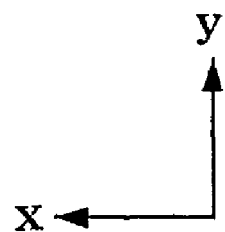

As illustrated in FIG. 2C, the metal layer 14 may be etched by, e.g., reactive ion etching, to form the metal wires 13. More specifically, portions of the metal layer 14 may be removed to expose the upper surfaces of the dielectric wires 12 and the bottom of each trench between adjacent dielectric wires 12, so only vertical portions of the metal layer 14 deposited on the sidewalls of the dielectric wires 12 may remain. The reactive ion etching may have a high accuracy and easy thickness control. However, other etching methods of metal, e.g., an ion milling using a collision shock of ions, a sand blast to inject ultra-fine ceramic powder, a wet-etching using an alkali or acid liquid based solution, a reactive gas etching by using any kind of air stream in a direction orthogonal to the substrate 1, and so forth, are within the scope of the present invention.

The wire grid polarizer 10 formed according to embodiments of the present invention may be advantageous in having a sufficiently high transmittance and extinction ratio due to a fine pitch and a high aspect ratio thereof. More specifically, since at least one of two sidewalls of each metal wire 13 has a portion not in contact with an adjacent dielectric wire 12, the wire grid polarizer 10 may exhibit an improved transmittance and extinction ratio, as compared to a conventional wire grid polarizer, e.g., a wire grid polarizer having both sidewalls of a metal wire completely in contact with adjacent dielectric wires, while having a substantially same aspect ratio. Further, the wire grid polarizer 10 may exhibit a substantially improved mechanical stability due to support of the metal wires 13 by the dielectric wires 12, thereby providing improved structural reliability. Additionally, the pitch d1 may be adjusted to be about half the pitch d2, thereby simplifying the manufacturing process, increasing production efficiency, and facilitating formation of a large-area wire grid polarizer.

Figure 3:
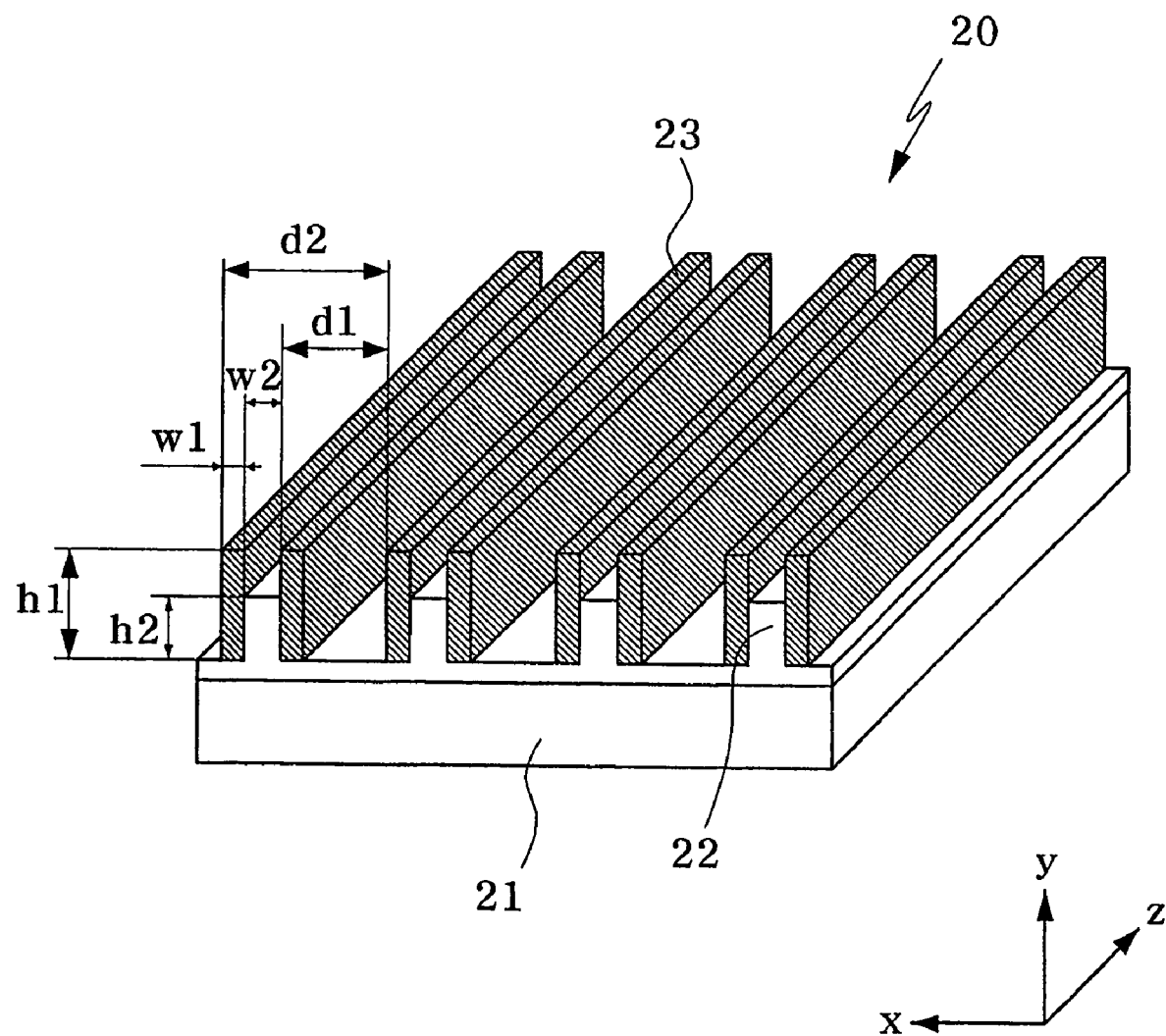
FIG. 3 illustrates a perspective view of a wire grid polarizer according to another embodiment of the present invention.

According to another embodiment illustrated in FIG. 3, a wire grid polarizer 20 may include a substrate 21, a plurality of dielectric wires 22, and a plurality of metal wires 23. The substrate 21, dielectric wires 22, and metal wires 23 may be substantially similar to the substrate 11, dielectric wires 12, and metal wires 13, respectively, of the wire grid polarizer 10 illustrated in FIG. 1, with the exception of the dielectric wires 22 having a different height as compared to the metal wires 23. More specifically, the dielectric wires 22 may have a height h2 smaller than a height h1 of the metal wires 23, as illustrated in FIG. 3.

When the height h2 of the dielectric wires 22 is smaller than the height h1 of the metal wires 23, optical performance, e.g., transmittance and polarized-light separation function, of the wire grid polarizer 20 may be improved. For example, the height h2 of the dielectric wires 22 may be about 40% to about 70% of the height h1 of the metal wires 23. When the height h2 of the dielectric wires 22 is about 70% or less of the height h1 of the metal wires 23, transmittance and polarized-light separation may be improved. When the height h2 of the dielectric wires 22 is about 40% or more of the height hi of the metal wires 23, structural reliability of the wire grid polarizer 20 may be improved. Other structural details of the substrate 21, dielectric wires 22, and metal wires 23 of the wire grid polarizer 20 may be substantially similar to elements of the wire grid polarizer 10 described previously with respect to FIG. 1, and therefore, their detailed description will not be repeated.

Figure 4A:
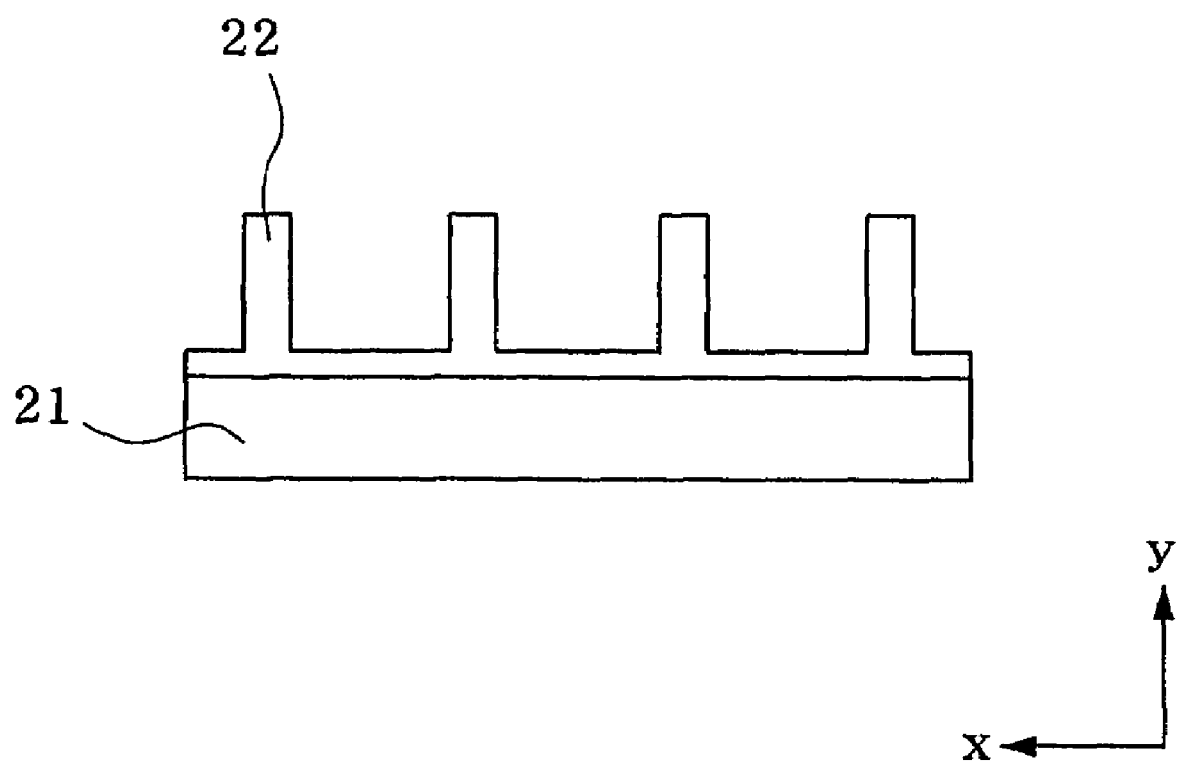
FIGS. 4A-4D illustrate cross-sectional views of stages in a method of manufacturing the wire grid polarizer of FIG. 3.

The wire grid polarizer 20 may be manufactured as follows. First, as illustrated in FIG. 4A, a resin layer may be processed by, e.g., a nano-imprint lithography, to form the dielectric wires 22 to have the width w2, height h2, and pitch d2. The nano-imprint lithography process may be substantially similar to the process described previously with respect to FIG. 2A, and therefore, detailed description thereof will not be repeated.

Figure 4B:
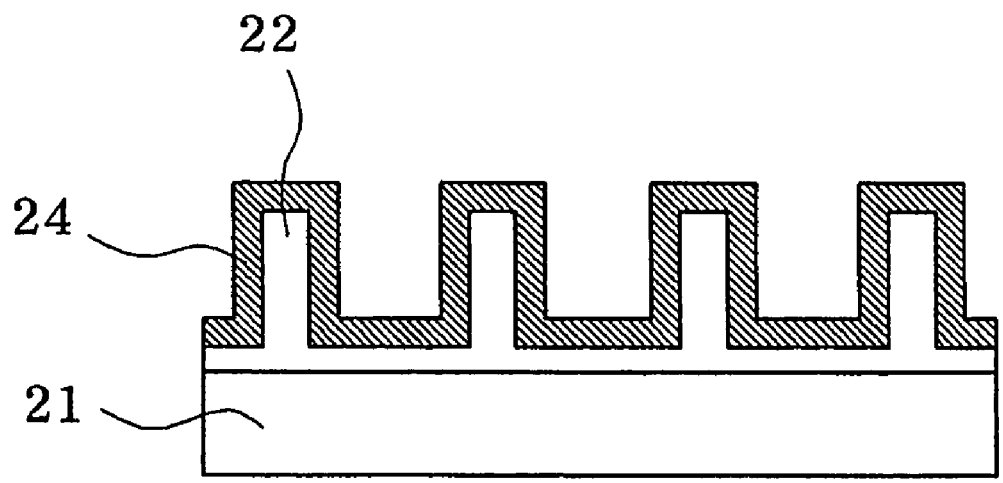
Figure 4B:
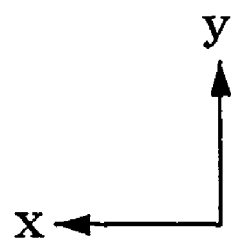

As illustrated in FIG. 4B, a metal layer 24 may be formed on the dielectric wires 22 by, e.g., PVD and/or CVD, to coat an upper surface and sidewalls of each dielectric wire 22 and a bottom of each trench between adjacent dielectric wires 22. Formation of the metal layer 24 may be substantially similar to the process described previously with respect to FIG. 2B, and thus, a detailed description thereof will not be repeated.

Figure 4C:
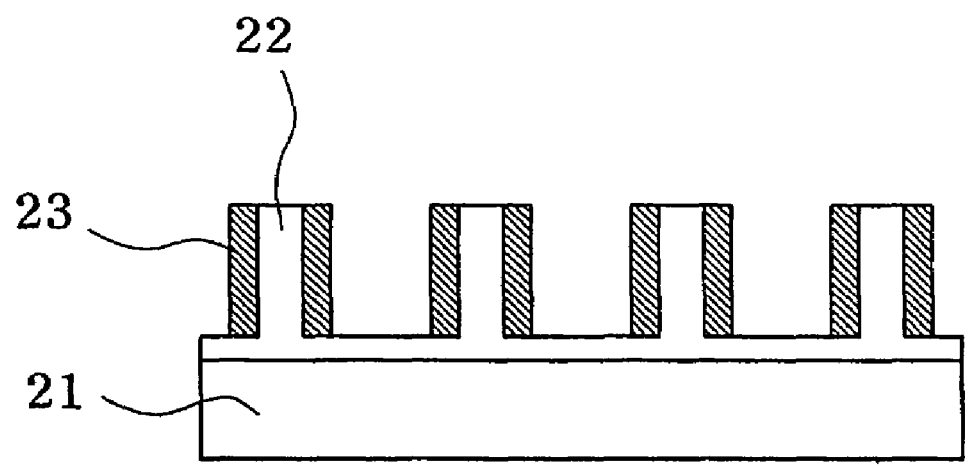
Figure 4C:
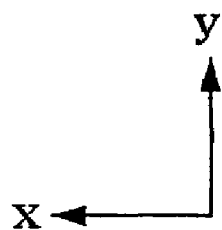

As illustrated in FIG. 4C, the metal layer 24 may be etched to form the metal wires 23. Etching of the metal layer 24 may be substantially similar to the process described previously with respect to FIG. 2C, and thus, a detailed description thereof will not be repeated.

Figure 4D:
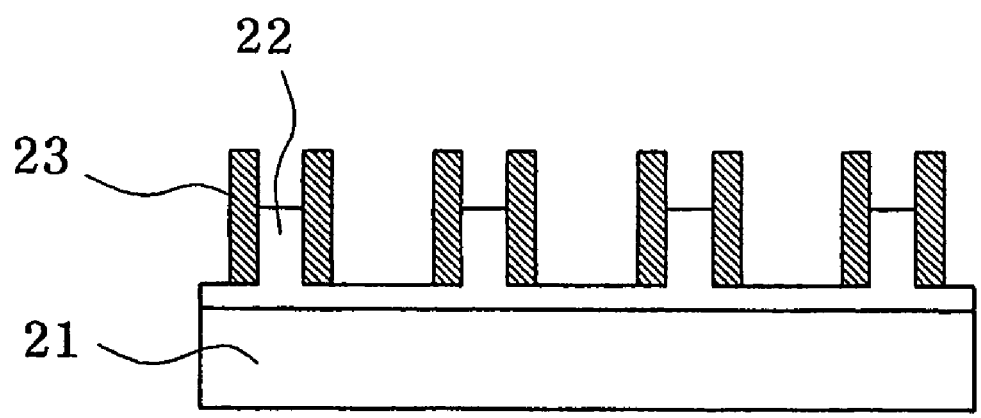
Figure 4D:
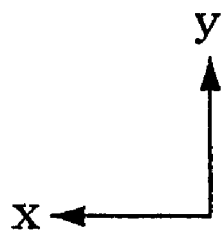

As illustrated in FIG. 4D, a partial upper portion of each dielectric wire 22 may be removed, such that the height h2 of the dielectric wires 22 may be lower that the height h1 of the metal wires 23. The upper portion of the dielectric wires 22 may be removed by, e.g., wet etching and/or dry etching, so potential effects on the metal wires 23 may be minimized. For example, a reactive ion etching may be used, employing oxygen as a reactive gas in order to minimize structural effects on the metal wires 23, while etching the dielectric wires 22.

Figure 5:
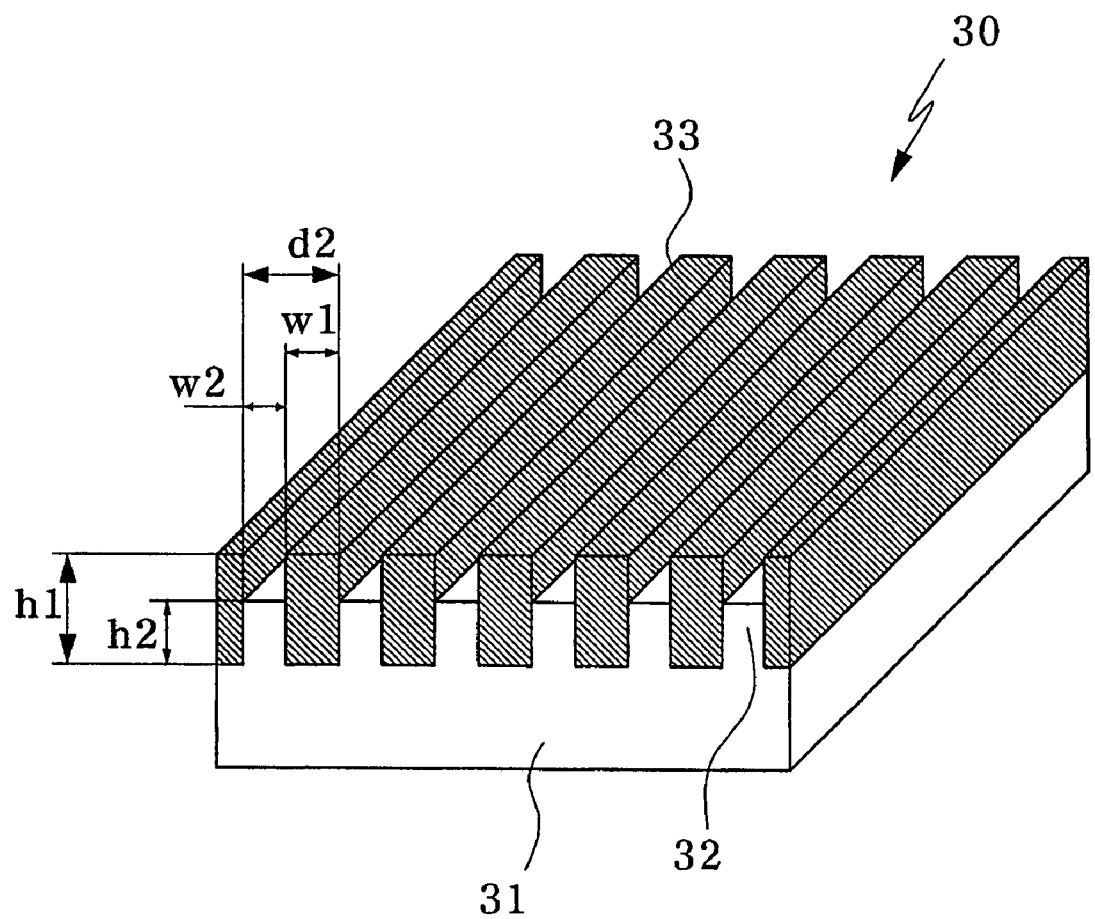
FIG. 5 illustrates a perspective view of a wire grid polarizer according to another embodiment of the present invention.
Figure 5:
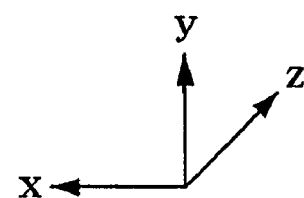

According to another embodiment of the present invention illustrated in FIG. 5, a wire grid polarizer 30 may include a substrate 31, a plurality of dielectric wires 32, and a plurality of metal wires 33. The wire grid polarizer 30 may be substantially similar to the wire grid polarizer 20 illustrated in FIG. 3, with the exception of having the pitch d2 of the dielectric wires 32 to be substantially equal to the pitch d1 of the metal wires 33. The relationship of the width, height, and pitch of the dielectric and metal wires 32 and 33 may be represented by h2<h1 and w1+w2=d1=d2. Accordingly, a single metal wire 33 may be formed between adjacent dielectric wires 32, so both sidewalls of each metal wire 33 may be in contact with respective adjacent dielectric wires 21, i.e., a width w1 of the metal wire 33 may substantially equal a width of a distance between adjacent dielectric wires 32. The height h2 of the dielectric wires 32 may be, e.g., about 40% to about 70% of the height h1 of the metal wires 33, thereby improving optical operation of the wire grid polarizer 30. Widths w1 and w2 may be adjusted to have any suitable ratio.

The wire grid polarizer 30 may be advantageous in exhibiting improved optical operation and high structural reliability. Other structural details of the dielectric wires 32, metal wires 33, and substrate 31 may be substantially similar to the structural details of the wire grid polarizers 10 and 20 described previously with reference to FIGS. 1 and 3, and therefore, will not be repeated.

A method of manufacturing the wire grid polarizer 30 according to an embodiment of the present embodiment will be described with reference to FIGS. 6A-6D.

Figure 6A:
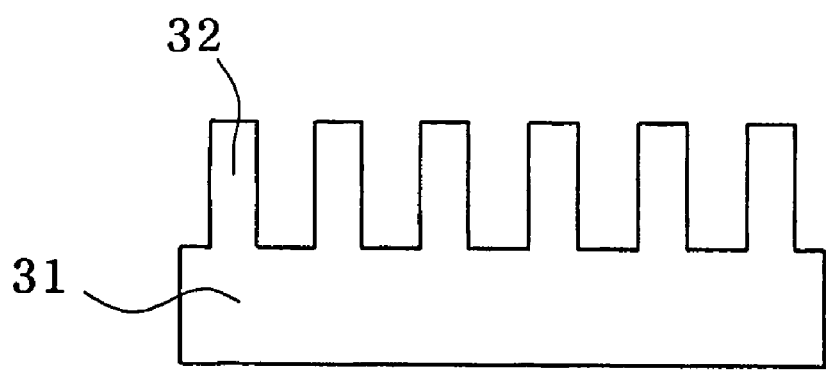
FIGS. 6A-6D illustrate cross-sectional views of stages in a method of manufacturing the wire grid polarizer of FIG. 5.
Figure 6A:
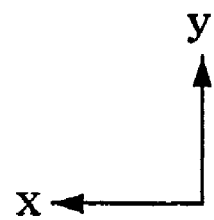

As illustrated in FIG. 6A, a resin substrate may be processed by, e.g., a nano-imprint lithography, to form the dielectric wires 32 to have the width w2, height h2, and pitch d2. The nano-imprint lithography process may be substantially similar to the process described previously with respect to FIG. 2A, and therefore, detailed description thereof will not be repeated. However, other processing methods are within the scope of the present invention. It should be noted, however, that FIG. 6A illustrates direct processing of a surface of the resin substrate rather than the resin layer.

Figure 6B:
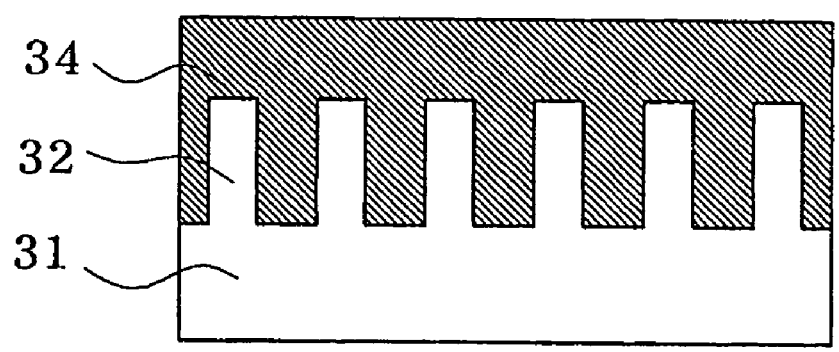
Figure 6B:
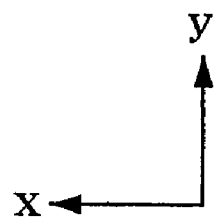

As illustrated in FIG. 6B, a metal layer 34 may be formed on the dielectric wires 32 by, e.g., PVD and/or CVD, to completely fill trenches between adjacent dielectric wires 32 and coat upper surfaces of the dielectric wires 32. Formation of the metal layer 34 may be substantially similar to the process described previously with respect to FIG. 2B, and thus, a detailed description thereof will not be repeated.

Figure 6C:
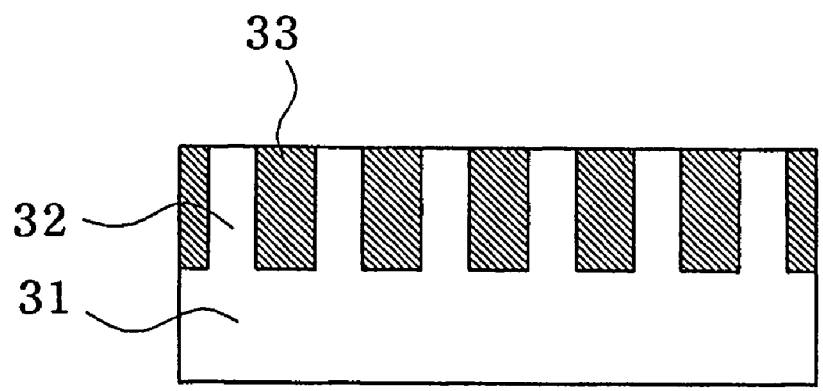

As illustrated in FIG. 6C, an upper portion of the metal layer 34 may be, e.g., wet etched using an aqueous alkali solution, to expose upper surfaces of the dielectric wires 32. Other etching methods, e.g., wet etching using an aqueous acid solution, a reactive ion etching, an ion milling using a collision shock of ions, a sand blast to inject ultra-fine ceramic powder, and so forth, are within the scope of the present invention.

Figure 6D:
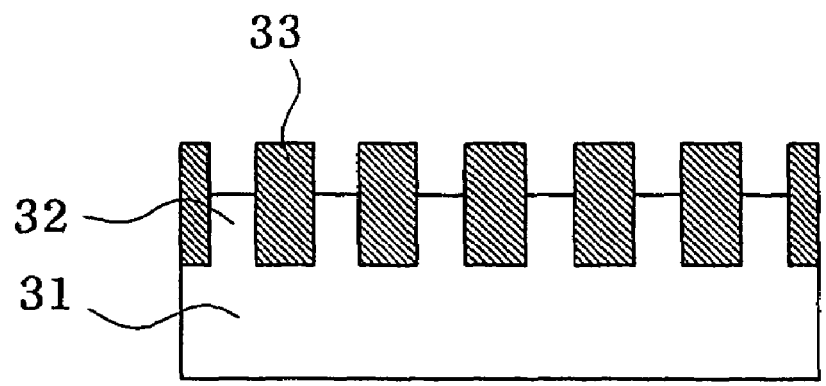
Figure 6D:
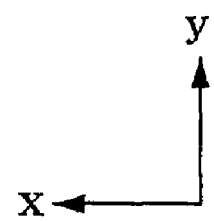

As illustrated in FIG. 6D, a partial upper portion of each dielectric wire 32 may be removed, such that the height h2 of the dielectric wires 32 may be lower that the height hi of the metal wires 33. Etching of the upper portions of the dielectric wires 32 may include any suitable etching method capable of removing portions of the dielectric wires 32 without affecting the structure of the metal wires 33. For example, the etching may include a reactive ion etching using oxygen as a reactive gas, wet etching using a methylene chloride solution or methylmethacrylate (MMA) solution, and so forth.

The wire grid polarizer 30 may be advantageous in having metal wires with a narrow width and a high aspect ratio, thereby realizing a high transmittance and extinction ratio. Further, since the metal wires 33 may be supported by the dielectric wires 32, the metal wires 33 may exhibit increased mechanical stability, thereby resulting in overall increased structural reliability of the wire grid polarizer 30.

EXAMPLES

Three wire grid polarizers were formed according to embodiments of the present invention, i.e., Examples 1-3, and compared to two wire grid polarizers formed according to Comparative Examples 1-2. The wire grid polarizers of Examples 1-3 and Comparative Examples 1-2 were evaluated in terms of transmittance and extinction ratio. The evaluation was done via a simulation based on a rigorous coupled wave analysis (RCWA) method and via direct measurement. The direct measurement of the actual transmittance and extinction ratio were done using a spectrophotometer with a polarizer, i.e., VAP-7070 equipment (JASCO Corp.).

Example 1 a plurality of parallel dielectric wires having a width of 49 nm, a height of 175 nm, and a pitch of 140 nm were formed on a PC film having a thickness of 100 μm by a nano-imprint lithography. The dielectric wires were formed by coating a UV curable resin, i.e., a PAK-01 having a refractive index of 1.5 (by Toyo Gosei Co. Ltd.), over the PC film by means of a wire bar, stacking a mold subjected to a release treatment on the UV curable resin, curing the resin by UV light, and releasing the mold. Distance between adjacent dielectric wires was measured to be 91 nm.

Next, an aluminum layer having a uniform thickness of 21 nm was formed over the plurality of dielectric wires by a chemical vapor deposition (CVD), i.e., upper surfaces of each dielectric wire and surfaces of each gap between adjacent dielectric wires. The CVD was used by employing a reactive gas and methylpyrrolidine-alane (MPA). That is, the PC film was heated to a temperature of 105° C. in a vacuum chamber, the MPA gas was introduced for 75 seconds, argon (Ar) gas was bubbled until an internal pressure of the chamber reached 30 Pa, and the aluminum was deposited to coat the dielectric wires.

Next, a reactive ion etching was used to etch the aluminum layer to form aluminum wires along sidewalls of the dielectric wires. The reactive ion etching was performed by introducing boron chloride ($BCl_3$) as an etching gas into the vacuum chamber and radicalizing the $BCl_3$ by microwave plasma having a magnetic field to facilitate a reaction between the $BCl_3$ and the aluminum. The aluminum wires were formed to have a width of 21 nm and a height of 175 nm, thereby having an aspect ratio of 8.3. Since one dielectric wire was formed between two aluminum wires and in direct contact therewith, patterns having an overall width of 91 nm and gaps of 49 nm therebetween, i.e., pitch of 140 nm, were formed. The formed patterns had an aspect ratio of 1.92, thereby providing sufficient structural rigidity to substantially minimize metal wire collapse.

The performance of the wire grid polarizer formed in Example 1 was simulated and measured. Simulated results showed transmittance of 42.1% and an extinction ratio of 70,000:1. Measured results showed a transmittance of 40.8% and an extinction ratio of 20,000:1. Both simulated and measured results exhibited a sufficiently high transmittance and polarized-light separation function. It is noted that the deviation of the measured results from the simulated results was due to the complex refractive index of the aluminum, i.e., an imaginary part of the measured complex refractive index of the aluminum was lower than the value used for calculations.

Example 2 a plurality of parallel dielectric wires having a width of 60 nm, a height of 200 nm, and a pitch of 200 nm were formed of PMMA having a refractive index of 1.5 on a glass substrate by thermal nano-imprint lithography. More specifically, the glass substrate was formed to include an anti-reflection coating, i.e., sequentially stacked three layers of titanium dioxide and one layer of silicon dioxide, on a first surface thereof. A second surface of the glass substrate, i.e., a surface opposite the anti-reflection structure, was spin-coated with a solution containing PMMA in a solvent. The solution was dried to form a PMMA layer having a thickness of 1 μm. Next, the PMMA-coated glass substrate was heated to a temperature of 150° C. to soften the PMMA layer, followed by pressing a mold to the softened PMMA layer and cooling the PMMA layer to a room temperature while keeping it in a pressed state. The mold was released to realize the dielectric wires on the glass substrate.

Next, an aluminum layer having a uniform thickness of 40 nm was formed on the dielectric wires by a CVD to coat an upper surface and sidewalls of each dielectric wire and a bottom of each trench between adjacent dielectric wires. The CVD was performed by introducing MPA for 150 seconds into a vacuum chamber heated to a temperature of 105° C. and bubbling argon gas to reach an internal pressure of 30 Pa to facilitate aluminum deposition on the dielectric wires. The aluminum layer deposited on the dielectric wires was etched by a reactive ion etching to form aluminum wires having a height of 200 nm. $BCl_3$ gas was used to etch the aluminum layer.

Subsequently, an upper portion of each dielectric wire was removed by wet etching. More specifically, each dielectric wire was immersed in a methylene chloride solution and agitated until the height thereof was reduced from 200 nm to 100 nm. The aluminum wires were formed to have a width of 40 nm and a height of 200 nm, thereby having an aspect ratio of 5.0. The dielectric wires were formed to a width of 60 nm and a height of 100 nm, thereby forming patterns having an overall width of 140 nm and height of 200 nm with a low aspect ratio of 1.43.

The performance of the wire grid polarizer formed in Example 2 was simulated and measured. Simulated results showed transmittance of 43.2% and an extinction ratio of 570,000:1. Measured results showed transmittance of 42.2% and an extinction ratio of 40,000:1. Both simulated and measured results exhibited a high transmittance and polarized-light separation function.

Example 3 a plurality of dielectric wires having a width of 50 nm, a height of 175 nm, and a pitch of 100 nm were formed in a PMMA film having a thickness of 125 μm by thermal nano-imprint lithography. Processing of the PMMA was done according to a substantially similar process described in Example 2. Next, an aluminum layer having a thickness of 300 nm was formed on the dielectric wires and in trenches therebetween by CVD. The CVD was performed by introducing MPA for 20 minutes into a vacuum chamber heated to a temperature of 105° C. and bubbling argon gas to reach an internal pressure of 30 Pa to facilitate aluminum deposition on the dielectric wires. The aluminum was deposited to form a uniform layer having a thickness of 300 nm.

Subsequently, the aluminum was etched with a sodium hydroxide (NaOH) solution having a concentration of 0.1 mol/l. More specifically, the PMMA film formed with the aluminum layer was immersed in the NaOH solution and agitated to remove the aluminum deposited on the dielectric wires. Finally, a partial upper portion of each elongated dielectric wire was removed by a reactive ion etching using oxygen as a reactive gas until the dielectric wire had a height of 125 nm. The dielectric wires were formed to have a width of 50 nm, a height of 125 nm, and a refractive index of 1.5, and were positioned to have a pitch of 100 nm. The aluminum wires were formed to have a width of 50 nm and a height of 175 nm, thereby having a high aspect ratio of 3.5.

The performance of the wire grid polarizer formed in Example 3 was simulated and measured. Simulated results showed transmittance of 42.2% and an extinction ratio of 70,000:1. Measured results showed transmittance of 41.8% and an extinction ratio of 40,000:1. Both simulated and measured results exhibited a high transmittance and polarized-light separation function.

Figure 7:
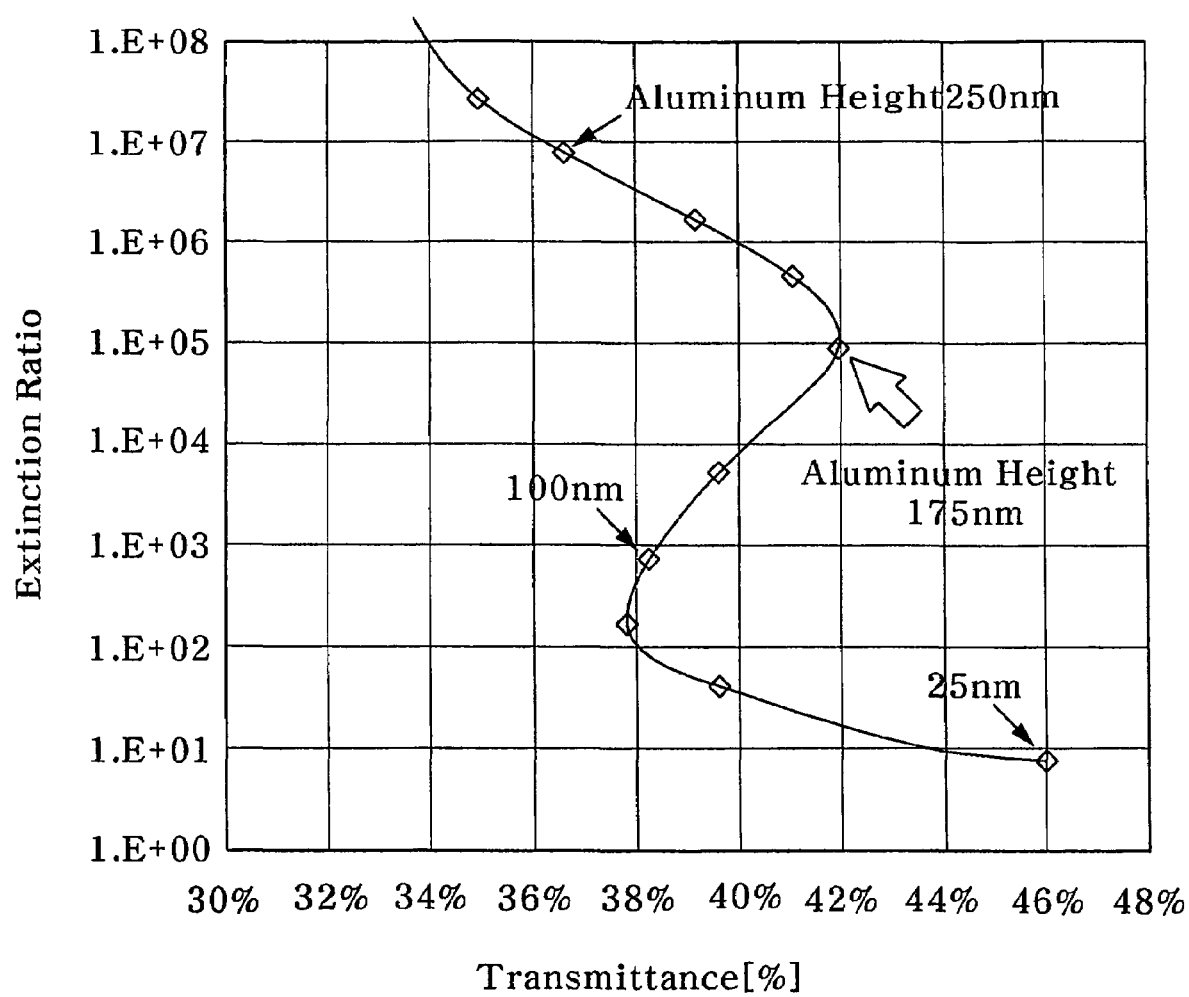
FIGS. 7-8 illustrate simulation results of optical performance of wire grid polarizers of Comparative Examples 1-2, respectively.

Comparative Example 1 a plurality of aluminum wires having a width of 70 nm and a pitch of 140 nm were arranged on a glass substrate. No dielectric wires were formed on the glass substrate. A simulation was performed on the resultant wire grid polarizer, and FIG. 7 illustrates a plot of the extinction ratio and transmittance as a function of the aluminum wires height. As illustrated in FIG. 7, a sufficiently high transmittance and extinction ratio was accomplished when the aluminum wires had a height of 175 nm, thereby having a relatively low aspect ratio of 2.5.

Figure 8:
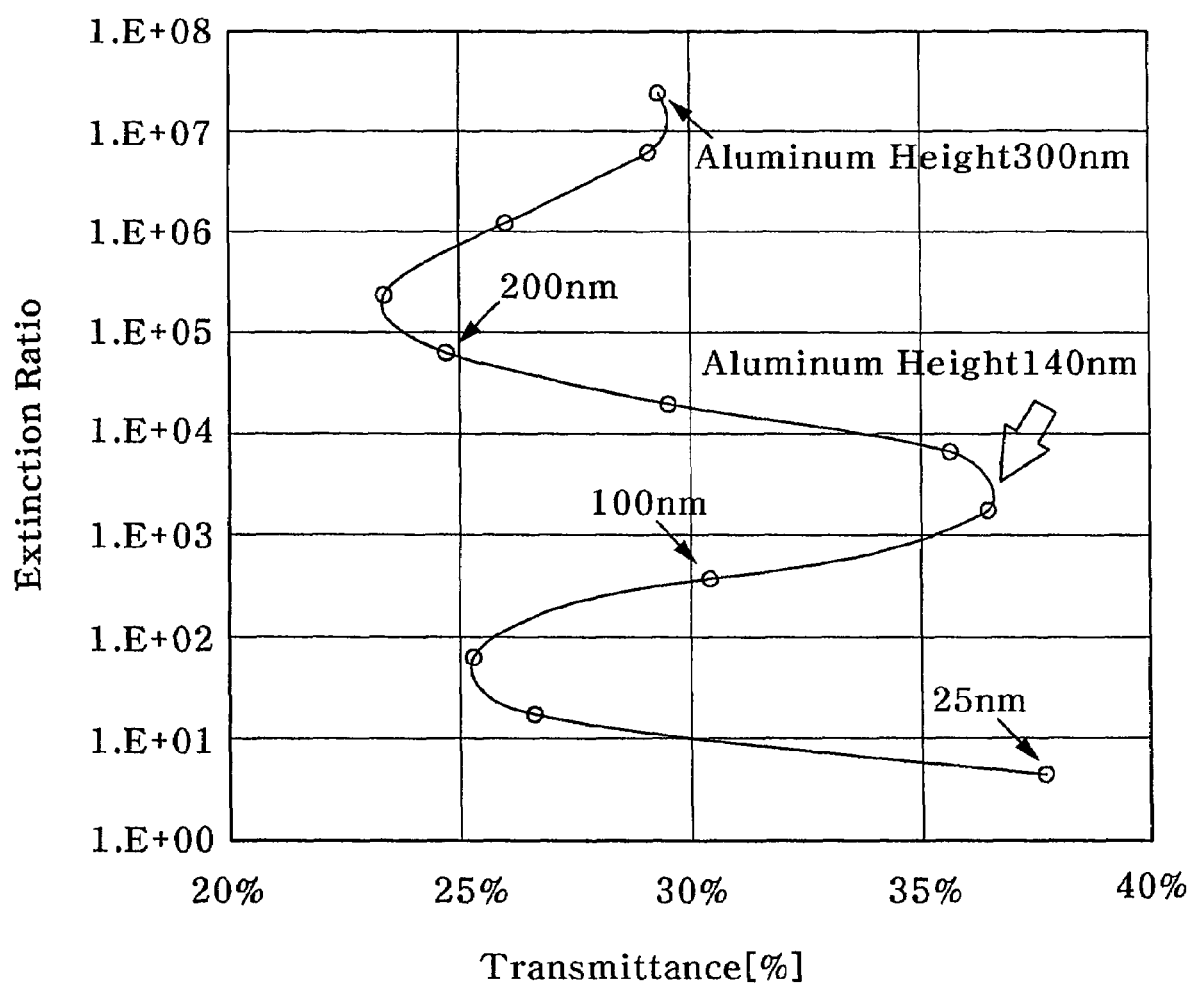

Comparative Example 2 a transparent dielectric material was deposited to completely fill trenches between the aluminum wires 8 of Comparative Example 1, i.e., the dielectric material had a substantially same height as the aluminum wires. A simulation was performed on the resultant wire grid polarizer, and FIG. 8 illustrates a plot of the extinction ratio and transmittance as a function of the aluminum wires height. As illustrated in FIG. 8, a sufficiently high transmittance and extinction ratio could not be achieved. More specifically, as further illustrated in FIG. 8, the wire grid polarizer had transmittance of about 37% at most and an extinction ratio of about 3,000:1 when the aluminum wires had a height of 140 nm. That is, the extinction ratio increased as the transmittance decreased. Accordingly, for the wire grid polarizer of Comparative Example 2 to exhibit a transmittance of 40% or more and an extinction ratio of 20,000:1 or more, the aluminum wires could be potentially formed to have a width of 28 nm, a height of 130 nm, and a pitch of 70 nm in order to have an aspect ratio of 4.6. However, such a structure may be impractical, and may be too complex to manufacture.

Embodiments of the present invention may be advantageous in providing improved structural reliability to the wire grid polarizer. When using the wire grid polarizer according to embodiments of the present invention in several advantages may be achieved. For example, when using the wire grid polarizer in a LCD, improved light efficiency, prolonged lifespan, and reduced size/weight, e.g., battery in an information terminal of a mobile phone, may be achieved, thereby providing a cheaper product with a reduced number of elements.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A wire grid polarizer, comprising:
a substrate adapted to transmit predetermined wavelengths of light;
a plurality of dielectric wires extending parallel to one another along a first direction on the substrate, the dielectric wires including a dielectric material adapted to transmit the predetermined wavelengths of light; and
a plurality of metal wires extending along the first direction between the dielectric wires,
wherein each metal wire has a sidewall having a first height and each dielectric wire has a sidewall having a second height, the second height being smaller than the first height, and the sidewall of the metal wire including a first portion in contact with the sidewall of the dielectric wire and a second portion not in contact with the sidewall of the dielectric wire.

2. The wire grid polarizer as claimed in claim 1, wherein the first portion of the sidewall of each metal wire is in direct contact along its entire length with the sidewall of the dielectric wire.

3. The wire grid polarizer as claimed in claim 1, wherein the second portion of the sidewall of each metal wire is not in direct contact along its entire length with the sidewall of the dielectric wire.

4. The wire grid polarizer as claimed in claim 1, wherein two metal wires are between two adjacent dielectric wires.

5. The wire grid polarizer as claimed in claim 4, wherein the two metal wires between the two adjacent dielectric wires are spaced apart.

6. The wire grid polarizer as claimed in claim 1, wherein the dielectric wires are wider than the metal wires.

7. The wire grid polarizer as claimed in claim 1, wherein a height of the sidewall of each dielectric wire is about 40% to about 70% of a height of the sidewall of each metal wire.

8. The wire grid polarizer as claimed in claim 4, wherein the height of the sidewall of each dielectric wire is about 40% to about 70% of the height of the sidewall of each metal wire.

9. The wire grid polarizer as claimed in claim 1, wherein a single metal wire is between two adjacent dielectric wires.

10. A wire grid polarizer, comprising:
a substrate adapted to transmit predetermined wavelengths of light; and
a plurality of patterns spaced apart and extending along a first direction on the substrate, the patterns having a multi-wire structure including a dielectric wire between two metal wires,
wherein each metal wire has a sidewall having a first height and each dielectric wire has a sidewall having a second height, the second height being smaller than the first height, and the sidewall of the metal wire including a first portion in contact with the sidewall of the dielectric wire and a second portion not in contact with the sidewall of the dielectric wire.

11. A method of manufacturing a wire grid polarizer, comprising:
forming a plurality of dielectric wires along a first direction on a substrate adapted to transmit predetermined wavelengths of light, such that the dielectric wires are parallel to one another and include a dielectric material adapted to transmit the predetermined wavelengths of light; and
forming a plurality of metal wires extending along the first direction between the dielectric wires,
wherein each metal wire has a sidewall having a first height and each dielectric wire has a sidewall having a second height, the second height being smaller than the first height, and the sidewall of the metal wire including a first portion in contact with the sidewall of the dielectric wire and a second portion not in contact with the sidewall of the dielectric wire.

12. The method as claimed in claim 11, wherein forming the plurality of metal wires includes forming a metal layer to coat upper surfaces and sidewalls of the dielectric wires.

13. The method as claimed in claim 12, wherein forming the metal layer includes chemical vapor deposition.

14. The method as claimed in claim 12, wherein forming the plurality of metal wires includes removing portions of the metal layer by an anisotropic etching to form two metal wires between two adjacent dielectric wires.

15. The method as claimed in claim 14, wherein removing the metal layer includes a reactive ion etching.

16. The method as claimed in claim 14, further comprising removing upper portions of the dielectric wires.

17. The method as claimed in claim 11, further comprising removing upper portions of the dielectric wires wherein removing upper portions of the dielectric wires includes forming the sidewall of each dielectric wire having the second height that is about 40% to about 70% of the first height of the sidewall of each metal wire.

18. The method as claimed in claim 11, wherein forming the plurality of metal wires includes forming a metal layer to fill trenches between adjacent dielectric wires and coat upper surfaces thereof.

19. The method as claimed in claim 18, wherein forming the plurality of metal wires includes removing portions of the metal layer to expose upper surfaces of the dielectric wires, and removing upper portions of the dielectric wires, such that the second height of sidewall of each dielectric wire equals about 40% to about 70% of the first height of the sidewall of each metal wire.

20. The method as claimed in claim 11, wherein forming the plurality of dielectric wires includes performing a nano-imprint lithography.

* * * * *